Dec. 22, 1964  J. J. BELL  3,162,291
CONVEYING APPARATUS FOR ARRANGING MASSED ARTICLES
INTO A COLUMNIZED RELATIONSHIP
Filed May 2, 1962  3 Sheets-Sheet 3

INVENTOR
John J. Bell

BY
Irons, Birch, Swindler & McKie
ATTORNEYS

3,162,291
CONVEYING APPARATUS FOR ARRANGING MASSED ARTICLES INTO A COLUMNIZED RELATIONSHIP
John J. Bell, Pasadena, Md., assignor to Maryland Glass Corporation, Baltimore, Md., a corporation of Maryland
Filed May 2, 1962, Ser. No. 191,931
8 Claims. (Cl. 198—30)

This invention relates generally to the art of handling and arranging masses of randomly arranged conveyed articles into a columnized relationship. More specifically, the invention is directed to an apparatus for unscrambling articles such as green glass articles passing in a generally randomly arranged mass from a glass annealing lear and arrange the articles in one or more in-line columns.

The conveyor arts suggest various constructions adapted for receiving a mass of articles disposed in a generally haphazard relation and arrange them in an in-line or single file column relationship. These constructions are generally employed for a variety of purposes such as, for example, to deliver the articles received in a random mass formation into column formation to labeling, packing, filling and other machines designed to perform an operation on the articles when the articles are fed to the machine in a columnized relationship. This type of apparatus is quite frequently employed in connection with the handling of cans, bottles, cartons and various shaped containers where boxes of the empty containers are supplied to the vicinity where the operation of filling, labeling, packing, etc. is to be performed.

Attempts have been made in the past to employ available conveyor structures as described above for handling green glass articles as they pass in a mass of generally haphazard or random formation from the end of the conveyor of a glass annealing lear. However, due to the rather delicate condition of a glass article as it passes from the annealing lear, the conventionally available conveyors for unscrambling masses of articles and forming them into column relationship have not proven entirely satisfactory. Although as it leaves the annealing lear, the glass article is practically at room temperature, the state of the glass which forms the article is such that it is quite prone to being scratched or marred before it has cured by contact with other articles or with the parts of equipment used in handling the glass article.

Not only is the fact of scratching or marring of a glass article detrimental from the standpoint of its appearance and acceptability to the customer purchasing the glass article, but also, in connection with glass containers adapted to contain liquids or other materials under substantial pressure, an external scratch or mar can so weaken the container wall as to run the risk of its exploding or shattering either during filling or subsequently when it is stored with the material under pressure.

The problems particularly encountered in handling green glass articles passing from an annealing lear are especially critical in connection with constructing unscrambler apparatus which must receive a mass of upright standing articles passing from the lear in a random formation and arrange such articles to move them away in a column relationship. This moving and arranging of the articles must be accompanied by an absolute minimum of surface to surface contact between adjacent articles and surface contact of the articles with moving or stationary parts of the apparatus. Further, articles such as glass containers in an upright standing position must be carefully manipulated so that they will not tip over in carrying out the moving and arranging into column relationship.

In facing these problems, it thus becomes essential that the unscrambler apparatus produce no sharp striking or rubbing together of the green glass articles or undue rubbing of the articles with stationary or moving parts of the apparatus. Further, there can be no suddent changes in the speed or direction of movement imparted as the articles move from the lear conveyor or while being arranged into column relationship by the unscrambler apparatus.

In recognition of the problems as outlined hereinabove, it is a principal object of the instant invention to provide improved apparatus for satisfactory handling of upright standing articles such as green glass containers leaving an annealing lear in a random mass and arranging such articles into column relationship.

It is a further important object of the instant invention to provide apparatus in accordance with the above object and which is particularly effective in receiving a mass of articles from a lear conveyor to convey the articles in the same direction as the direction of their movement along the lear conveyor.

Another object of the instant invention is to provide apparatus wherein articles conveyed in a mass of random formation can be effectively separated and arranged in single file or column relationship without involving serious congestion of the articles in effecting such operation whereby contact between articles or contact of the articles with moving or stationary parts of the apparatus is minimized.

It is also an important object of the instant invention to provide apparatus embodying conveyor means for moving along a mass of randomly arranged articles, such apparatus embodying an unscrambler wheel which rotates contrary to the direction of movement of the conveyor means with guide means associated with the wheel to converge the articles toward a column relationship, said guide means terminating upstream from the periphery of the wheel and having a recessed pocket disposed between the wheel and the termination point of the guide means to receive articles moved by the wheel out of possible congested areas at the throat of the guide means where the articles pass the wheel.

The above and other objects and novel features of the instant invention will be readily apparent from the following description taken in connection with the accompanying drawings. It is to be expressly understood that the drawings are for the purpose of illustration and are not intended to define the limits of the invention but rather to merely illustrate a preferred embodiment and structure incorporating the features of the instant invention.

In the accompanying drawings forming a part of this specification and wherein like reference numerals are employed to designate like parts:

Figure 2:
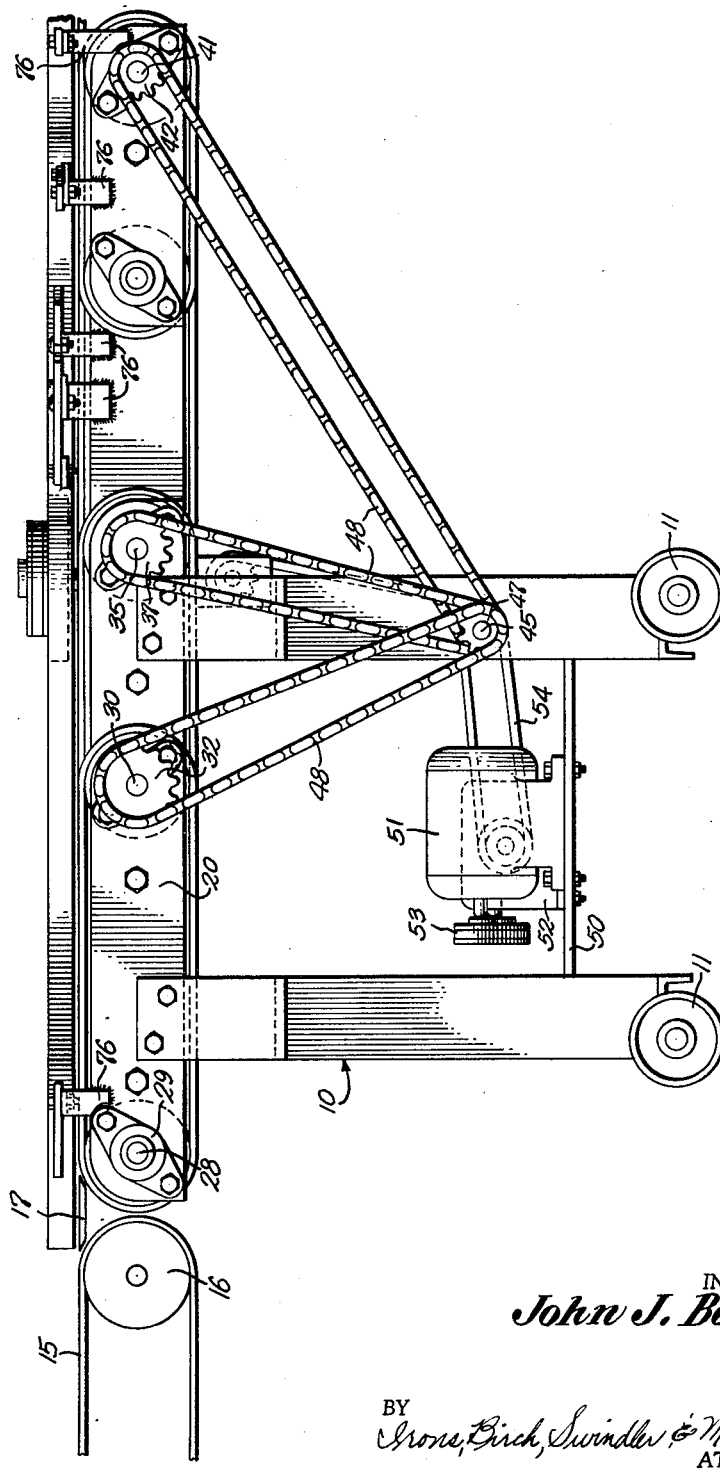
FIGURE 2 is a side elevational view of the apparatus of FIGURE 1 and showing the discharge end of a glass annealing lear conveyor with which this apparatus is particularly designed for use.
Figure 3:
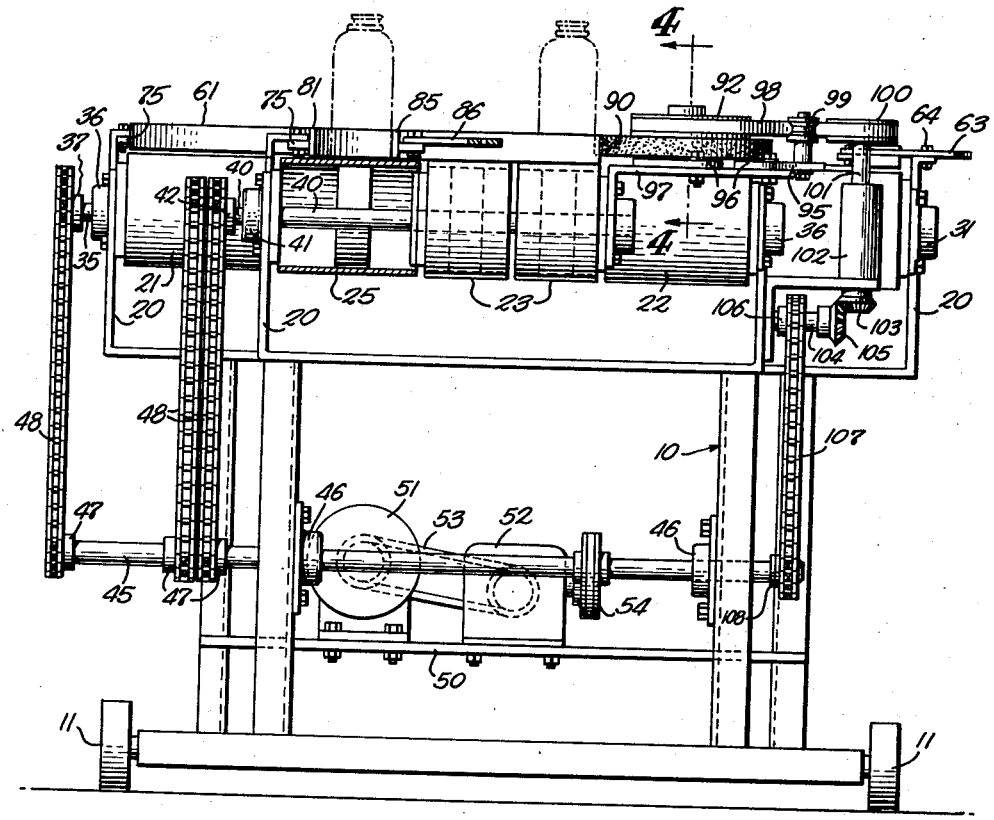
FIGURE 3 is an end elevational view of the apparatus shown in FIGURES 1 and 2.
Figure 4:
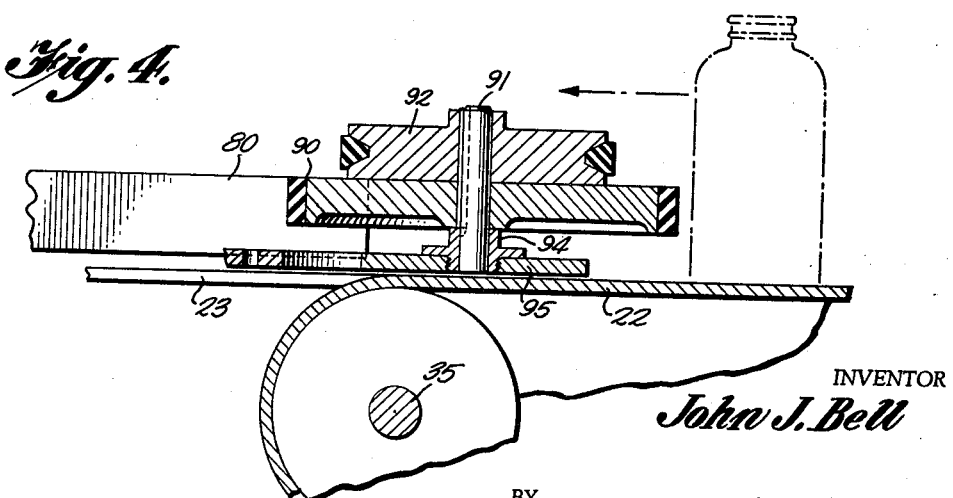
FIGURE 4 is a detailed sectional view taken on line 4—4 of FIGURE 3.

Referring initially to FIGURE 2, the unscrambler apparatus of the instant invention is shown as including a supporting framework 10 mounted to be movable between different locations as desired on wheels 11 secured to framework 10. In the application for which the apparatus is particularly adapted, the unscrambler is positioned as shown so that the conveyor means thereof is disposed in line with the path of movement of glass articles passing from an annealing lear conveyor. Thereby, the direction of movement of the articles is not changed during handling of the articles so that scratching, marring or upsetting the upright standing articles is avoided.

Figure 1:
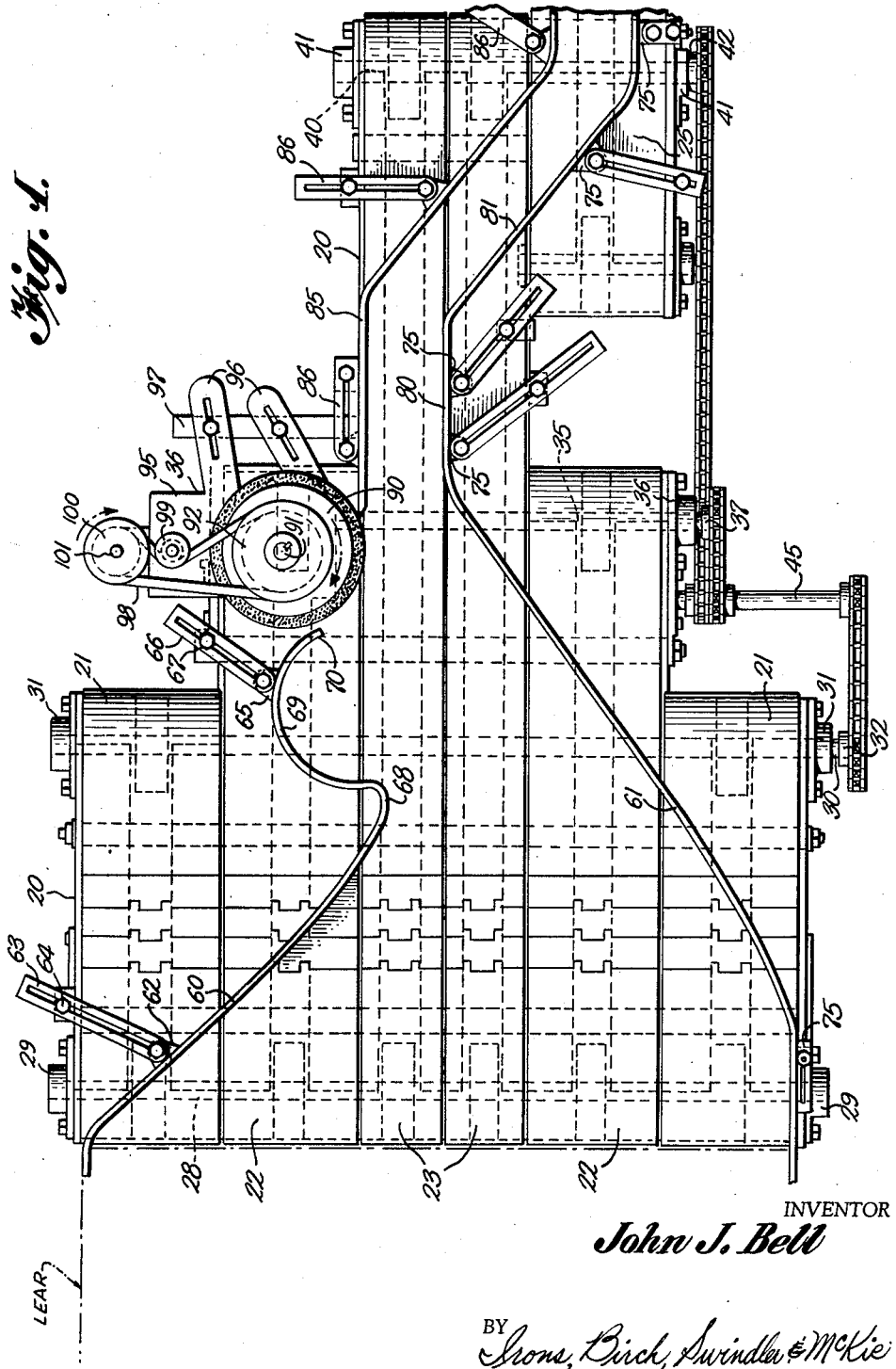
FIGURE 1 is a plan view of the unscrambler apparatus of the instant invention.

In FIGURE 1, the end of the lear conveyor is shown in phantom bearing the legend "LEAR." In FIGURE 2, a portion of the lear conveyor belt is shown at 15 passing around the bend pulley 16 at the outer end of the lear. A bridging plate 17 is disposed in the plane of the lear conveyor belt 15 and conveyor means of the end of the unscrambler apparatus. This plate 17 is stationarily mounted and extends across the width of the lear belt 15 and infeed end of the conveyor means on the unscrambler apparatus so as to bridge the gap between the lear conveyor and unscrambler conveyor means for expeditious transfer of the glass articles from the lear conveyor onto the unscrambler apparatus.

The framework 10 includes a horizontal bed 20 supported at the upper end thereof which mounts a series of separate parallel conveyor belts, such belts being individually shown more clearly on FIGURE 1. These belts are preferably constructed of interlinked metal plate elements as is conventional so that each belt forms an essentially continuous article supporting surface. Collectively, the belts provide a horizontal conveying surface extending from the infeed end of the apparatus where the conveyor means formed by these belts receive the mass of randomly arranged articles to be formed into the column relationship. The construction of such metal link belts is well known and illustration of their structural details is not deemed necessary herein.

Referring to the individual belts which collectively form the horizontal conveying surfaces of the unscrambler apparatus, reference may be had to FIGURE 1. In the embodiment as illustrated on this figure, two outer belts 21 are provided of generally similar length. Inwardly and with their outer edges closely abutting the inner edges of belts 21 there are provided two intermediate belts 22. A pair of parallel inner belts 23 are disposed between the intermediate belts 22. The upper surfaces of the belts 21, 22 and 23 are co-planar and desirably, the edges of adjacent belts are in closely abutting relation so that there is essentially no intervening space between such edges. It may also be mentioned that in consideration of the peculiar problems encountered in handling green glassware, the surfaces of the metal belts are preferably high polished to minimize scratching or abrading of the glass articles supported thereon.

In the particular apparatus arrangement shown, the outer belts 21 are relatively short, the intermediate belts 22 somewhat longer and the inner belts 23 the longest of the three pairs of belts. It will be appreciated as the description continues and from the appended claims that this particular length relationship and the number of belts involved may be varied considerably within the scope of the invention.

It may be noted that overlapping one lateral edge of the outfeed end of one conveyor belt 23, there is shown the end portion of a conveyor belt 25 which is disposed to receive the columnized flow of articles as they leave the unscrambler apparatus. It will be understood that belt 25 is suitably driven to carry the column of articles past an inspection station, gaging station, packing station, etc. Although shown connected to the unscrambler apparatus, the belt 25 may be appropriately driven by a separate source of power and is associated with the unscrambler apparatus to function as will become apparent from the description which follows.

Returning to consideration of the conveyor belts 21, 22 and 23, it will be recognized from FIGURES 1 and 2 that all of these belts are trained over rollers which are mounted on a shaft 28 that extends across the infeed end of the apparatus. The shaft 28 is journalled in bearings 29 mounted on the horizontal bed 20. A shaft 30 mounts rollers over which the opposite ends of belts 21 are trained. The shaft 30 extends between the runs of belts 22 and 23 and is supported in bearings 31 on bed 20.

The ends of belt 22 opposite the infeed end of the apparatus are trained over rollers carried on a shaft 35, the shaft being mounted in bearings 36 carried by the horizontal bed 20 and extending between the runs of belts 23.

Belts 23 extend to the rearmost end of the horizontal bed 20 where they are trained over rollers mounted on a shaft 40. The shaft is journalled in bearings 41 one of which is mounted on bed 20 and the other of which is shown as mounted on the exterior of the frame carrying belt 25.

Shaft 30 has a sprocket 32 secured thereto. Shaft 35 has a sprocket 37 mounted thereon and a sprocket 42 is mounted on the outwardly extending end of shaft 40. The framework 10 mounts an idler shaft 45 journalled in bearings 46 secured to the framework 10. Shaft 45 has affixed thereto three similarly sized sprockets 47. Drive chains 48 engage with each of the sprockets 47 with one drive chain drivingly engaging with sprocket 32 on shaft 30, another engaging with sprocket 37 on shaft 35 and the third engaging with sprocket 42 on shaft 41.

The framework 10 includes a platform 50 on which is mounted a suitable electric motor 51 connected to a speed reducer 52 by a belt and pulley drive 54 to drive the shaft 45. It will thus be seen that by energization of motor 51, the individual belts 21, 22 and 23 are driven by the various belt and chain transmission means described.

It should be pointed out that as most clearly shown in FIGURE 2, the sprockets 32, 37 and 42 are of progressively decreasing diameter, while the sprockets 47 on idler shaft 45 are of similar diameter. This results in the chain drive imparting a relatively slow surface speed to belts 21, a relatively fast surface speed to belts 23 and an intermediate surface speed to belts 22. Thus as viewed in the apparatus of FIGURE 1, the outer belts 21 will convey articles at a slower speed than the speed of conveying articles on belt 22 and articles moving onto belts 23 will move faster than articles on either belts 21 or 22. This increasing speed of belt surface movement is important in facilitating arranging the articles in column relationship as they move onto and along the infeed ends of the parallel belts 21, 22 and 23.

The unscrambler apparatus has associated with the conveying surface formed by the belts 21, 22 and 23 means for converging the mass of articles which are moved along the apparatus and are to be arranged into columnized relationship. This converging means includes a guide 60 extending along one lateral edge of the conveyor means and a guide 61 extending along the opposite lateral edge of the conveyor means.

These guides are conveniently formed of appropriate strip metal construction and advantageously may be coated with an appropriate plastic such as Teflon to promote ease of movement and minimum marring of green glass articles which may be passed along the guides while also reducing wear of the guides. The individual guides extend above the conveying surface of the conveyor means formed by belts 21, 22 and 23 and are specifically formed as an important feature of the instant invention, to cooperate with an unscrambling wheel which forms a part of the converging means to effect arrangement of the articles in columnized relationship.

The guide 60 has a mounting ear 62 on its outer face adjacent the infeed end of the unscrambler apparatus. A slotted bracket 63 is pivotally connected to ear 62. Bracket 63 is affixed to the bed 20 by a fastening means 64 connected to an element secured to bed 20. The opposite end of the guide 60 is provided with a similar ear 65 to which is pivotally connected a slotted bracket 66. This slotted bracket is adjustably secured to bed 20 by a fastening means 67 extending through the slotted end of the bracket and engaged with an appropriate element affixed to the side of bed 20. By providing the slotted brackets 63 and 66 pivotally connected to the guide 60, the guide may be suitably adjusted to appropriately position it with reference to the conveying surface of the belts which the guide overlies.

Particular attention is directed to the configuration of guide 60 and its relationship to the conveying surface which it overlies, this configuration and relationship being an important feature of the instant invention. The initial portion of guide 60 extends diagonally from the infeed end of the conveyor means above the conveying surface of belt 21 and belt 22 at one side of the apparatus. This diagonally extending portion of the guide terminates in a nose portion at 68 at a point generally overlying the outer edge of belt 23 and upstream in the flow of conveyed articles from the unscrambler wheel periphery. The remaining portion of the guide is formed into a recessed pocket 69, which pocket extends laterally outwardly from the path of the article conveying surface of belt 23 overlying the article conveying surface of the adjacent belt 22. The pocket 69 of the guide 60 terminates at 70 immediately adjacent the periphery of the unscrambler wheel. It has been found that with approximately one-fourth of the unscrambler wheel exposed between the end 70 of the pocket 69 and the guide forming one side of the throat through which the articles pass in columnized relationship the dispersion of congestion of the glass articles will be particularly effective irrespective of the size of the particular glass article, such as glass containers, being unscrambled.

Guide 61 in the embodiment as illustrated is provided with mounting ears 75. Appropriate fastening means or slotted brackets are attached to these mounting ears as shown in FIGURE 1 whereby the guide is fastened to elements 76 secured to the side wall of the bed 20 as shown in FIGURE 2. Thereby guide 61 is held in the desired adjusted position to overlie and extend along a lateral edge of the unscrambler apparatus.

As shown in FIGURE 1, the guide 61 has an initial portion extending diagonally from the infeed end of the conveyor means across the surface of belts 21, 22 and 23 at one lateral edge of the apparatus. Thereafter, it extends at 80 above the junction between the two belts 23 and then at 81 diagonally to overlie the surface of conveyor belt 25. In guiding the columnized flow of articles from the unscrambler apparatus, a third guide 85 provided with suitable mounting means 86 extends in parallel relation to the portions 80 and 81 of guide 61. It will be appreciated that the mounting means 86 function to support the guide 85 above the conveying surface of the conveyor belts that it overlies.

The unscrambler wheel 90, which is slightly eccentric with reference to the stub shaft 91 to which it is keyed, is driven by a pulley 92 also keyed to the shaft 91. Shaft 91 is rotatably mounted on plate 95 in bearing 94, the plate extending inwardly from support brackets 96 secured to the bed 20 by support 97. A belt 98 engages with pulley 92, passing over a tensioning pulley 99 and around a drive pulley 100. Drive pulley 100 is supported on a shaft 101 journalled in bearing 102 and provided at its lower end with bevel gear 103. Bearing 102 is appropriately mounted on the horizontal bed 20.

A shaft 104 appropriately rotatably mounted on bed 20 carries a bevel gear 105 which meshes with gear 103. A sprocket 106 is affixed to shaft 104 to be driven by a chain 107 drivingly cooperating with a sprocket 108 on shaft 45. It will thus be seen that as motor 51 drives the belts 21, 22 and 23 through the transmission means heretofore described, the shaft 45 will effect driving of the unscrambler wheel 90 through the chain, sprockets, gears and belt drive described immediately hereinabove. The slight eccentricity of wheel 90 tends to promote the unscrambling action and minimize build-up or congestion of articles in the throat formed between the portion 80 of guide 61 and guide 85.

Although a single unscrambler wheel 90 and guide 60 with a configuration and relationship as shown in FIGURE 1 have been illustrated on the drawings, it will be appreciated that this combination may, if desired, be duplicated on the opposite side of the unscrambler apparatus in place of guide 61. Also, if desired, the columnization of the articles may provide a double line of articles to feed two outfeeds in place of the single line shown in the embodiment of the drawings. With a double outfeed line, the two conveyors 23 may be appropriately used to convey away the two columnized outfeed lines.

As the articles move from the lear conveyor belt 15 across bridging plate 17 in a more or less random haphazard formation, the movement of conveyor belts 21, 22 and 23 accelerates the articles with belts 23 moving the articles at the center at a faster speed, belts 22 moving the articles at a somewhat slower speed, and belts 21 moving the articles at a still slower speed. The guides 60 and 61 converge the articles toward the center of the apparatus and as the articles pass the nose portion 68 of the guide, the articles move toward the throat between guide portion 80 and guide 85. Congestion at this throat is alleviated by the action of unscrambler wheel 90 which is driven in the direction of the arrow thereon. The articles that may collect thus move into pocket 69 pending alleviation of the congested condition whereupon they automatically, by the forward movement of belts 22 and 23, move back into the stream and pass through the throat in columnized form.

It may be pointed out that the relationship of the nose 68 of the guide 60 to the peripheral portion of unscrambler wheel 90 which overlies belt 23 is considered to be of importance in functioning of the apparatus. Thus the nose 68 of guide 60 should be generally in line with this peripheral portion, upstream in the flow path of the articles moving along the conveying surface of belt 23. Also the nose 68 as well as a peripheral portion of wheel 90 should overlie the conveying surface of the high speed belt 23 for best operation of the apparatus in unscrambling the mass of articles.

It is to be understood that the form of this invention herewith shown and described is to be taken as a preferred example of the same and that various changes in shape, size and arrangement of the parts may be resorted to without departing from the spirit of the invention or the scope of the appended claims.

I claim:

1. Apparatus for arranging a mass of upright standing articles into columnized relationship comprising conveyor means presenting a generally horizontal conveying surface and having an infeed end to receive the mass of articles in random upright standing formation and an outfeed end, means for driving said conveyor means to move said conveying surface along a path from said infeed to said outfeed end, and means for converging the mass of articles on the conveyor means into columnized relationship as they are carried along said path on said conveying surface, said converging means including a wheel mounted to rotate about a vertical axis with a peripheral portion of said wheel overlying one lateral edge of said outfeed end of said conveyor means, means for driving said wheel to move the periphery overlying said one lateral edge in a direction opposite to the direction of movement of said conveying surface, guide wall means mounted extending along each side of said conveyor means converging toward the outfeed end of said conveyor means, said wall means along said one lateral edge extending generally toward said peripheral portion of said wheel and terminating upstream from said peripheral portion in the path of said conveying surface, and wall means forming a recessed pocket between said wheel and said termination with said pocket overlying said conveying surface.

2. Apparatus as recited in claim 1 wherein said wheel is eccentric to its rotation axis whereby its rotation further promotes avoidance of congestion of articles moving into columnized relationship.

3. Apparatus as recited in claim 1 wherein said conveyor means includes a plurality of separate parallel coplanar belts, said driving means is coupled to drive said belts at successively higher surface speeds as between adjacent belts, and said peripheral portion of said wheel overlies the outfeed end of the belt having the fastest surface speed.

4. Apparatus for unscrambling a mass of articles into columnized relationship comprising conveyor means presenting a generally horizontal conveying surface and having an infeed end to receive the mass of articles and an outfeed end for discharge of the articles in columnized relationship, means for driving said conveyor means to convey articles along a path from said infeed to said outfeed end of said conveyor means, guide means providing upstanding wall means extending along each side of said conveyor means above said conveying surface at the infeed end thereof, said guide means converging from said infeed end toward the outfeed end of said conveyor means, an unscrambler wheel mounted to rotate about a vertical axis with a peripheral portion of said wheel overlying a lateral edge of said outfeed end of said conveyor means, means for driving said wheel to move the periphery overlying said lateral edge of said conveyor means in a direction opposite to the direction of movement of said conveyor means, said wall means along at least one side of said conveyor means extending toward said wheel and having a recessed pocket adjacent said wheel and upstream relative to the flow of articles toward said wheel on said conveying surface.

5. Apparatus for unscrambling a mass of articles into columnized relationship comprising conveyor means presenting a generally horizontal conveying surface and having an infeed end to receive the mass of articles and an outfeed end for discharge of the articles in columnized relationship, means for driving said conveyor means to convey articles along a path from said infeed to said outfeed end of said conveyor means, guide means providing upstanding wall means extending along each side of said conveyor means above said conveying surface, said wall means extending diagonally from said infeed end across said conveying surface to converge into a throat at the outfeed end of said conveyor means for discharge of the articles in columnized relationship, an unscrambler wheel mounted to rotate about a vertical axis with a peripheral portion of said wheel overlying a lateral edge of said conveyor means immediately upstream from said throat in the path of article flow, means for driving said wheel, said wall means that extends along the side of said conveyor means on which said unscrambler wheel is mounted terminating in a nose upstream from said peripheral portion of said wheel in the path of article flow and having a pocket recessed from the path of article flow intermediate said wheel and said nose.

6. Apparatus for arranging a mass of upright standing articles in columnized relationship comprising conveyor means presenting a generally horizontal conveying surface and having an infeed end to receive the mass of articles in random upright standing formation and an outfeed end for discharge of the articles in columnized relationship, means for driving said conveyor means to move said conveying surface along a predetermined path from said infeed to said outfeed end, wall means mounted above said conveying surface to converge from said infeed end to a throat at the outfeed end of said conveyor means for discharge of articles in columnized relationship, said wall means being interrupted on at least one side of said conveying surface by an unscrambler wheel mounted to rotate about a vertical axis with a peripheral portion of said wheel overlying a lateral edge of said conveyor means upstream from said throat, and a laterally outwardly extending recessed pocket formed in said wall means upstream from the peripheral portion of said wheel.

7. Apparatus as recited in claim 6 wherein the periphery of said wheel is eccentric relative to its rotation axis and approximately one-fourth of said wheel periphery is exposed in the interruption of said wall means between said throat and said recessed pocket.

8. Apparatus as recited in claim 6 wherein said conveyor means includes a plurality of separate parallel coplanar belts, said driving means is coupled to drive said belts at successively higher surface speeds as between adjacent belts, and said peripheral portion of said wheel overlies the outfeed end of the belt having the fastest surface speed.

References Cited in the file of this patent
UNITED STATES PATENTS

| | | |
|---|---|---|
| 1,582,315 | Strandt | Apr. 27, 1926 |
| 2,047,106 | Lidberg | July 7, 1936 |
| 2,560,995 | Stiles | July 17, 1951 |
| 2,763,359 | Rose | Sept. 18, 1956 |